(12) United States Patent
Hatano et al.

(10) Patent No.: US 9,175,646 B2
(45) Date of Patent: Nov. 3, 2015

(54) EXHAUST GAS RECIRCULATION VALVE (71) Applicant: AISAN KOGYO KABUSHIKI KAISHA, Obu-shi, Aichi (JP)

(72) Inventors: Makoto Hatano, Nagoya (JP); Yukiya Kato, Nagoya (JP); Makoto Fujimori, Chita-gun (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 191 days.

(21) Appl. No.: 14/066,173

(22) Filed: Oct. 29, 2013

(65) Prior Publication Data
US 2014/0123964 A1 May 8, 2014

(30) Foreign Application Priority Data

Nov. 7, 2012 (JP) ................................. 2012-244964

(51) Int. Cl.
*F02M 25/07* (2006.01)
*F16K 1/44* (2006.01)
*F16K 1/54* (2006.01)
*F16K 31/04* (2006.01)

(52) U.S. Cl.
CPC ......... *F02M 25/079* (2013.01); *F02M 25/0773* (2013.01); *F02M 25/0792* (2013.01); *F16K 1/44* (2013.01); *F16K 1/54* (2013.01); *F16K 31/04* (2013.01); *Y02T 10/121* (2013.01)

(58) Field of Classification Search
CPC ............ F02M 25/079; F02M 25/0754; F02M 25/0771; F02M 25/0772; F02M 25/0773; F02M 25/0787; F02M 25/0788; F16K 31/06; F16K 5/10; F02D 41/0077; F01L 1/26; F01L 1/28; F01L 1/44; F01L 1/46; F01L 3/06

USPC ............ 123/568.11, 568.17, 568.23, 568.26, 123/188.1, 188.2, 188.4, 188.8; 137/614.16, 614.17; 251/129.11
See application file for complete search history.

(56) References Cited

U.S. PATENT DOCUMENTS

| 5,950,605 A | * | 9/1999 | Hussey et al. | ............ 123/568.26 |
| 2003/0132409 A1 | * | 7/2003 | Birkelund | .................. 251/30.04 |
| 2008/0042086 A1 | * | 2/2008 | Sisk et al. | ................. 251/129.02 |
| 2010/0282991 A1 | * | 11/2010 | Okamoto | .................. 251/129.15 |
| 2011/0315251 A1 | * | 12/2011 | Rampen et al. | ........... 137/561 R |

FOREIGN PATENT DOCUMENTS

| JP | A-2007-303434 | 11/2007 |
| JP | A-2008-202516 | 9/2008 |

* cited by examiner

*Primary Examiner* — Lindsay Low
*Assistant Examiner* — Grant Moubry
(74) *Attorney, Agent, or Firm* — Oliff PLC (57) ABSTRACT In an EGR valve, a valve element is seatable on a valve seat by stroke movement of a valve stem caused by an actuator. The valve seat has a cylindrical part with which a step of the stem is engageable. By the stroke movement of the valve stem, the opening degree between the valve seat and the valve element is changed. The valve seat is moved in the passage in the stroke movement direction to be engageable with a shoulder of the passage. As the valve element is moved together with the stem, the opening degree in the low opening range is changed. As the step of the stem is engaged with the cylindrical part and the valve seat is moved with respect to the shoulder, the opening degree in the high opening range is changed.

6 Claims, 6 Drawing Sheets

EXHAUST GAS RECIRCULATION VALVE

CROSS-REFERENCE TO RELATED APPLICATIONS

This application is based upon and claims the benefit of priority from the prior Japanese Patent Application No. 2012-244964, filed Nov. 7, 2012, the entire contents of which are incorporated herein by reference.

BACKGROUND OF THE INVENTION

1. Field of the Invention

The present invention relates to an exhaust gas recirculation valve provided in an exhaust gas recirculation passage of an exhaust gas recirculation apparatus and to be driven by an actuator to open and close.

2. Related Art

As a technique of the above type, there is conventionally known an exhaust gas recirculation valve (EGR valve) disclosed in for example JP 2008-202516A. In a housing of this EGR valve, a valve stem is provided to be movable through a bearing so that the valve stem is moved reciprocally (stroke movement) by an actuator to operate a valve element to open and close with respect to a valve seat. To be concrete, the valve stem is formed, in its one end portion, with male screw threads and the actuator is formed with female screw threads engaging with the male screw threads. The actuator is driven to cause screw motion of the male screw threads with respect to the female screw threads, thereby making stroke movement of the valve stem to open and close the valve element with respect to the valve seat. Accordingly, the gas flow characteristics of the EGR valve are defined by the shapes of the valve element and the valve seat. Due to this configuration, it is impossible to set gas flow characteristics extremely different between a low opening range and a high opening range.

SUMMARY OF INVENTION

Problems to be Solved by the Invention

For recent EGR devices, however, a high-flow EGR is demanded, whereas controlling an accurate EGR gas flow rate is required to improve fuel efficiency of an engine. Therefore, it is desired to use a single EGR valve for achieving both accurate flow characteristics in a low opening range of EGR gas and large flow characteristics in a high opening range.

The present invention has been made in view of the circumstances to solve the above problems and has a purpose to provide an exhaust gas recirculation valve capable of achieving both accurate flow characteristics in a low opening range and large flow characteristics in a high opening range.

Means of Solving the Problems

To achieve the above purpose, one aspect of the invention provides an exhaust gas recirculation valve including: a housing having a passage for exhaust recirculation gas; a valve seat provided in the passage; a valve element provided to be seatable on the valve seat; a valve stem integrally provided with the valve element to move the valve element with respect to the valve seat; and a drive unit to move the valve stem together with the valve element in stroke in an axial direction, an opening degree of the valve element being changeable with respect to the valve seat by stroke movement of the valve stem caused by the drive unit, wherein the passage is provided with a shoulder, the valve seat is provided to be movable in the passage in a direction of the stroke movement and engageable with the shoulder, the valve stem is provided with an engagement portion, and the valve element is moved with respect to the valve seat in association with the stroke movement of the valve stem to change an opening degree in a low opening range and further the engagement part engages with the valve seat and the valve seat is moved together with the valve element to change an opening degree in a high opening range.

Effects Of The Invention

According to the present invention, both accurate flow characteristics in a low opening range and large flow characteristics in a high opening range can be achieved by a single exhaust gas recirculation valve.

DESCRIPTION OF EMBODIMENTS

<First Embodiment>

A detailed description of a first embodiment embodying an exhaust gas recirculation valve (EGR valve) according to the present invention will now be given referring to the accompanying drawings.

Figure 1:
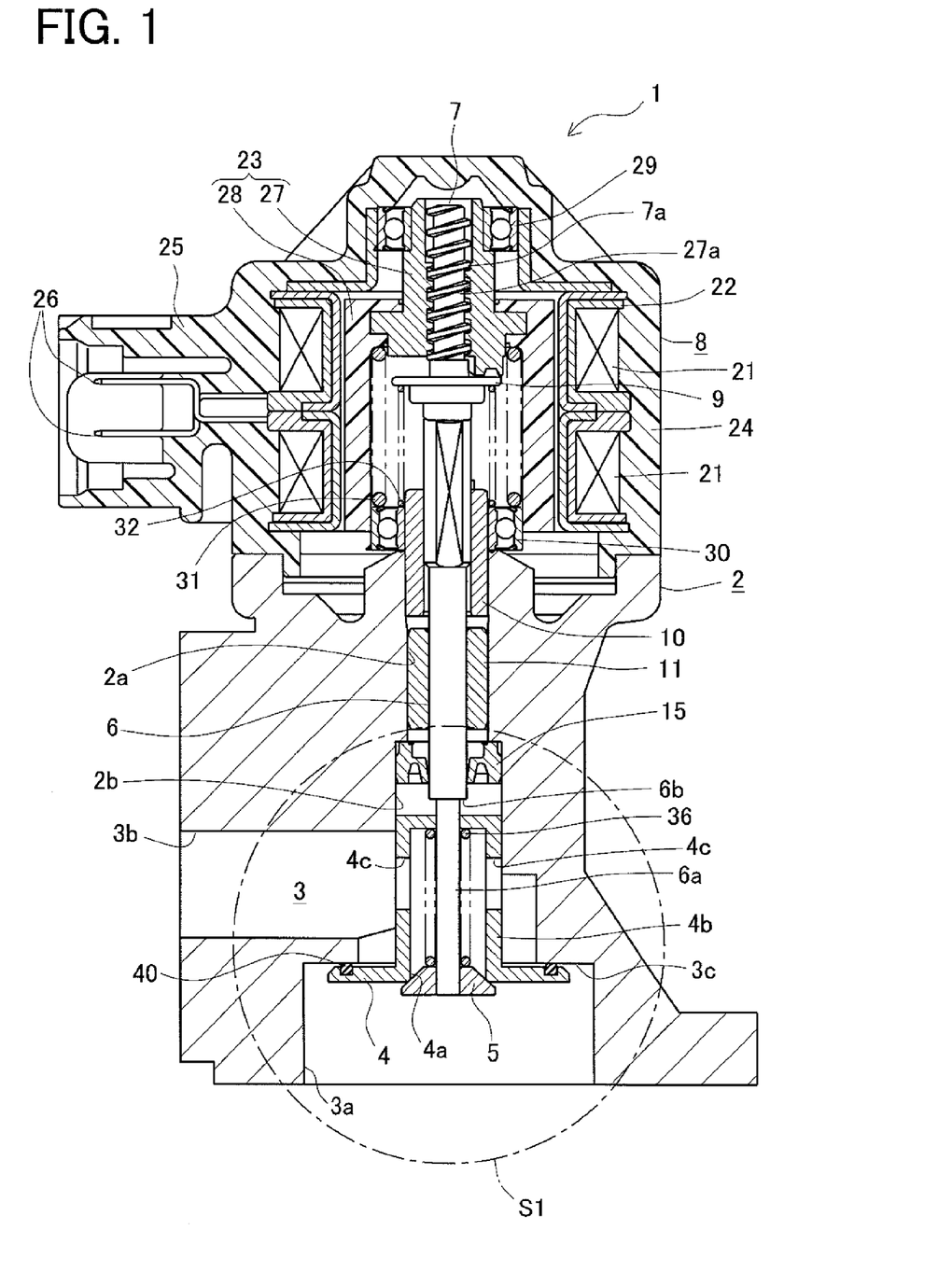
FIG. 1 is a front cross sectional view showing an EGR valve in a fully closed position in a first embodiment.
Figure 2:
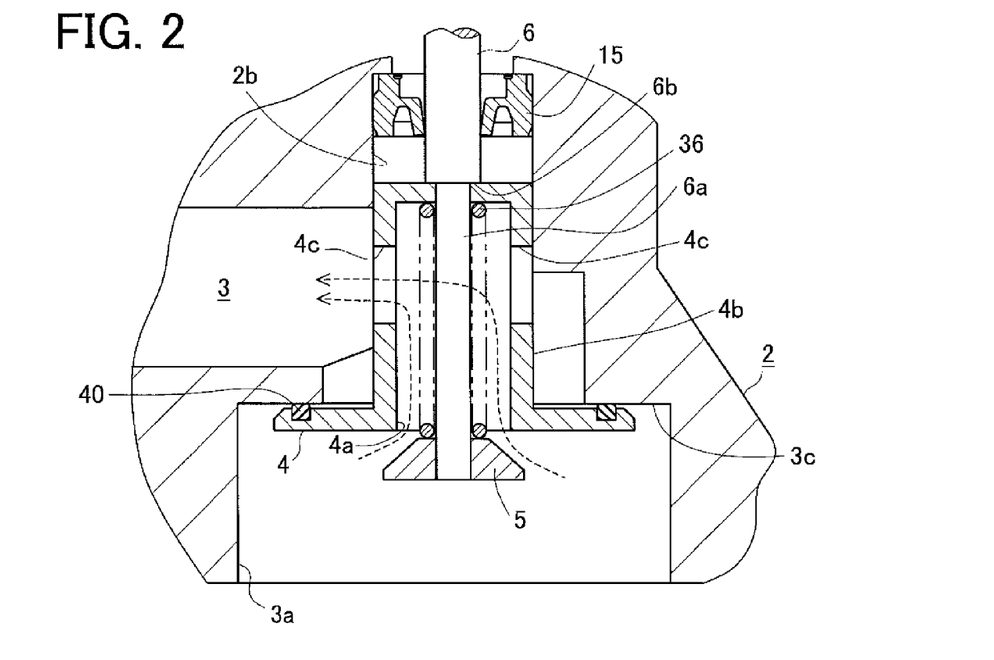
FIG. 2 is an enlarged cross sectional view showing a part circled with a chain line in FIG. 1 in an intermediately open position in the first embodiment.
Figure 3:
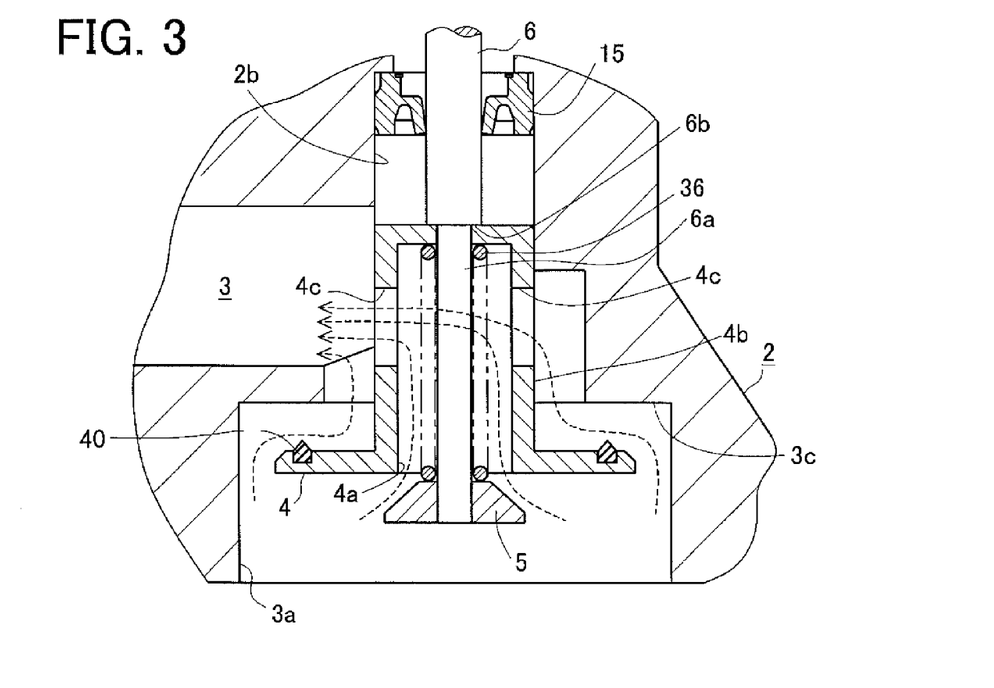
FIG. 3 is an enlarged cross sectional view showing the part circled with the chain line in FIG. 1 in a fully open position in the first embodiment.

FIG. 1 is a front cross sectional view showing an EGR valve 1 in a fully closed position. FIG. 2 is an enlarged cross sectional view showing a part S1 circled with a chain line in FIG. 1 in an intermediately open position. FIG. 3 is an enlarged cross sectional view showing the part S1 circled with the chain line in FIG. 1 in a fully open position. The EGR valve 1 is provided in an EGR passage for returning part of exhaust gas (EGR gas) discharged from an engine to the EGR passage to control an EGR gas flow rate. The EGR valve 1 includes a housing 2, a passage 3 for EGR gas formed in the housing 2, a valve seat 4 provided at some place in the passage 3, a valve element 5 provided to be seatable on the valve seat 4, a valve stem 6 integrally provided with the valve element 5 to move the valve element 5 with respect to the valve seat 4, and an actuator 8 serving as a drive unit to rotate an output shaft 7 to reciprocally move (make stroke movement) the valve stem 6 together with the valve element 5 in an axial direction.

The passage 3 formed in the housing 2 has an inlet 3a for introduction of EGR gas and an outlet 3b for discharge of EGR gas. The valve seat 4 is provided at some place in the passage 3 and has a valve hole 4a communicated with the passage 3.

The valve stem 6 is provided between the actuator 8 and the valve element 5 and placed to extend vertically through the housing 2 in FIG. 1. The valve element 5 is fixed to a lower end of the valve stem 6 and has a conical shape having a conical surface which will be brought into or out of contact with the valve seat 4. In an upper end of the valve stem 6, a spring retainer 9 is integrally provided. Between the housing 2 and the valve stem 6, a first thrust bearing 10 and a second thrust bearing 11 are arranged in series to support the valve stem 6 so as to allow stroke movement of the valve stem 6. Each of the thrust bearings 10 and 11 has a nearly cylindrical shape and is fixedly fitted in a mounting hole 2a formed in the center of the housing 2.

The actuator 8 includes a stator 22 including coils 21, a magnet rotor 23 provided inside the stator 22, and an output shaft 7 provided it the center of the magnet rotor 23. Those components 7, 21 to 23, and others are covered by a resin casing 24 by molding. The casing 24 is integrally formed with a connector 25 protruding sideways in FIG. 1. In this connector 25, terminals 26 extending from the coils 21 are provided.

The output shaft 7 has male screw threads 7a on an outer periphery thereof. A lower end of the outer shaft 7 is connected to the spring retainer 9 provided in the upper end of the valve stem 6. The magnet rotor 23 includes a rotor body 27, and a cylindrical plastic magnet 28 integrally provided on an outer periphery of the rotor body 27. On the outer periphery of an upper end portion of the rotor body 27, a first radial bearing 29 is provided between the rotor body 27 and the casing 24. On the inner periphery of a lower end portion of the plastic magnet 28, a second radial bearing 30 is provided between the magnet 28 and the first thrust bearing 10. Those upper and lower radial bearings 29 and 30 rotatably support the magnet rotor 23 inside the stator 22. The rotor body 27 is formed, in its center, with female screw threads 27a engaging the male screw threads 7a of the output shaft 7. A first compression spring 31 is provided between the magnet rotor 23 and the lower second radial bearing 30. A second compression spring 32 is provided between the spring retainer 9 in the upper end of the valve stem 6 and the second radial bearing 30 to urge the valve stem 6 toward the magnet rotor 23.

Between the housing 2 and the valve stem 6, a lip seal 15 having a nearly cylindrical shape to seal between the housing 2 and the valve stem 6 is provided adjacent to the second thrust bearing 11, as shown in FIG. 1. This lip seal 15 is directly press-fitted in a guide hole 2b formed continuously to the mounting hole 2a in the housing 2 so that the valve stem 6 extends through the center of the lip seal 15.

In this embodiment, the valve stem 6 includes, in its lower part, a small-diameter portion 6a having a smaller diameter than other portions, and a step 6b at a boundary with the small-diameter portion 6a. This step 6b is one example of an engagement part of the present invention. The valve seat 4 is formed in a flat plate shape and includes, in its center, a cylindrical part 4b extending upward and having a closed bottom (at an upper end in FIG. 1). The small-diameter portion 6a of the valve stem 6 extends through the cylindrical part 4b downward and is fixed with the valve element 5. The step 6b of the valve stem 6 is engageable with an upper end of the cylindrical part 4b.

The passage 3 is provided with a shoulder 3c contactable with the upper end of the valve seat 4 as shown in FIGS. 1 to 3. The valve seat 4 is provided to be movable in a direction of stroke movement of the valve stem 6 (a vertical direction in FIGS. 1 to 3) in the passage 3 and also provided to be engageable with the shoulder 3c.

The cylindrical part 4b is mounted movably up and down in the guide hole 2b. In this embodiment, the cylindrical part 4b and the guide hole 2b constitute one example of a guide unit of the invention to guide the valve seat 4 in the direction of stroke movement of the valve stem 6. The cylindrical part 4b is formed with a through hole 4c that communicates the inside of the cylindrical part 4b with the passage 3. In a contact portion of the valve seat 4 which will contact with the shoulder 3c, a seal member 40 is provided to seal between the valve seat 4 and the shoulder 3c. The seal member 40 is fixedly fitted in an annular groove formed in the valve seat 4.

In the present embodiment, a third compression spring 36 is provided inside the cylindrical part 4b and between the cylindrical part 4b and the valve element 5. This compression spring 36 is one example of an elastic member of the invention to hold the valve seat 4 in engagement with the shoulder 3c by an elastic force in a "low opening range" of the EGR valve 1. This compression spring 36 is held between the cylindrical part 4b and the valve element 5 to urge the valve seat 4 in a direction to bring the valve seat 4 in pressure contact with the shoulder 3c. The step 6b of the valve stem 6 is provided to be engageable with the upper end of the cylindrical part 4b.

In a fully closed state in which the valve seat 4 is in pressure contact with the shoulder 3c and the valve element 5 is seated on the valve seat 4 as shown in FIG. 1, the magnet rotor 23 is rotated in one direction. Accordingly, the engagement relation between the male screw threads 7a of the output shaft 7 and the female screw threads 27a of the rotor body 27 causes the output shaft 7 to rotate in one direction against the urging force of the second compression spring 32 to perform stroke movement in a downward direction in FIG. 1. In association with this stroke movement of the output shaft 7, the valve element 5 together with the valve stem 6 is moved in stroke in the downward direction in FIG. 1 and the valve element 5 is separated from the valve seat 4, thereby opening a valve as shown in FIG. 2. As the valve element 5 is moved with respect to the valve seat 4 in association with the stroke movement of the valve stem 6 as above, the opening degree in the "low opening range" of the EGR valve 1 is changed. The change in opening degree of the EGR valve 1 in the "low opening range" terminates when the step 6b of the valve stem 6 engages with the cylindrical part 4b. The change in opening degree of the EGR valve 1 in the "low opening range" is defined by the change in size of a clearance (a measuring section) between the valve element 5 and the valve seat 4. In this "low opening range", EGR gas having passed through between the valve element 5 and the valve seat 4 flows to a downstream side in the passage 3 through the through hole 4c of the cylindrical part 4b.

Thereafter, when the valve element 5 together with the valve stem 6 is further moved in stroke downward in FIG. 1, the step 6b of the valve stem 6 engages with the upper end of the cylindrical part 4b, thus pushing the valve seat 4 downward. Accordingly, the valve seat 4 is moved downward together with the valve element 5 as shown in FIG. 3, thereby changing the opening degree of the EGR valve 1 in an "intermediate opening range" and a "high opening range". As above, the changes in opening degree of the EGR valve 1 in the "intermediate opening range" and the "high opening range" are defined by the changes in size of a maximum clearance (a measuring section) between the valve element 5 and the valve seat 4 and a clearance (a measuring section) between the valve seat 4 and the shoulder 3c. In these "intermediate opening range" and the "high opening range", EGR gas flows to the downstream side in the passage 3 through between the valve seat 4 and the shoulder 3*c* and also the EGR gas passed through between the valve element 5 and the valve seat 4 flows to the downstream side in the passage 3 through the through hole 4*c* of the cylindrical part 4*b*. Thus, as compared to the flow rate of EGR gas flowing in the "low opening range", the flow rate in the "intermediate opening range" and the "high opening range" is sharply changed.

On the other hand, in a fully open state where the valve element 5 is separated from the valve seat 4 by a maximum distance and also the valve seat 4 is separated from the shoulder 3*c* by a maximum distance as shown in FIG. 3, the magnet rotor 23 is rotated in the opposite direction. Accordingly, the engagement relation between the male screw threads 7*a* of the output shaft 7 and the female screw threads 27*a* of the rotor body 27 and the urging force of the second compression spring 32 cause the output shaft 7 to rotate in the opposite direction to perform stroke movement in an upward direction in FIG. 1. In association with this stroke movement of the output shaft 7, the valve element 5 together with the valve stem 6 is moved in stroke in the upward direction in FIG. 1. Thus, the valve seat 4 first comes into engagement with the shoulder 3*c* and is held there under pressure by the third compression spring 36, and then the valve element 5 comes into contact with the valve seat 4, reaching a fully closed state.

In the present embodiment, as explained above, the valve element 5 functions as a small valve element and the valve seat 4 corresponding to the valve element 5 functions as a large valve element, respectively. These two, large and small, valve elements are arranged coaxially in series in the direction of stroke movement of the single valve stem 6 so that the small valve element (the valve element 5) and the large valve element (the valve seat 4) are opened in a stepwise fashion in association with the stroke movement of the valve stem 6.

Figure 4:
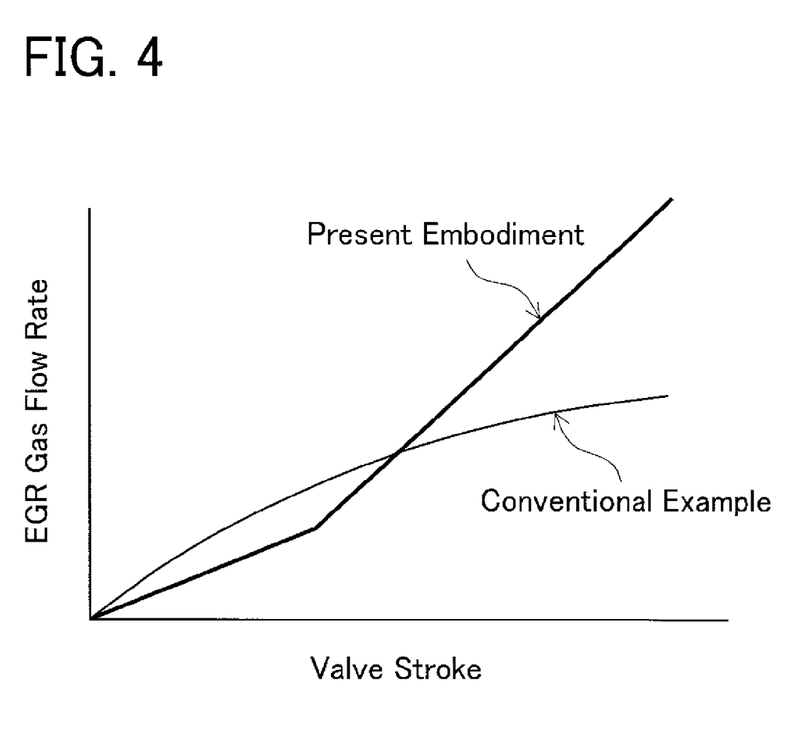
FIG. 4 is a graph showing flow characteristics of an EGR valve in comparison to flow characteristics of an EGR valve in a conventional example.

FIG. 4 is a graph showing the flow characteristics of the EGR valve 1 in the present embodiment in comparison to flow characteristics of an EGR valve in a conventional example. The graph in FIG. 4 shows changes in EGR gas flow rate with respect to valve stroke. In the present embodiment, as clearly found in this graph, the EGR gas flow rate with respect to the valve stroke changes gently in the "low opening range" and changes sharply in the "intermediate opening range" and the "high opening range" as compared to the conventional example. The EGR valve 1 in this embodiment can therefore obtain accurate flow characteristics capable of regulating an accurate amount of EGR gas in the "low opening range", and obtain large flow characteristics capable of regulating a large amount of EGR gas in the "intermediate opening range" and the "high opening range".

According to the EGR valve 1 in the present embodiment explained above, the opening degree in the "low opening range" is changed as the valve element 5 is moved with respect to the valve seat 4 in association with the stroke movement of the valve stem 6. Furthermore, when the step 6*b* of the valve stem 6 engages with the cylindrical part 4*b* and further the valve seat 4 is moved together with the valve element 5, the opening degree in the "intermediate opening range" and the "high opening range" is changed. In the "low opening range", therefore, the EGR gas flow rate is regulated in minute amounts by the measuring section between the valve seat 4 and the valve element 5. In the "intermediate opening range" and the "high opening range", the EGR gas flow rate is regulated in large amounts by the measuring section between the valve seat 4 and the valve element 5 and the measuring section between the shoulder 3*c* and the valve seat 4. As a result, the single EGR valve 1 can achieve both the accurate flow characteristics in the "low opening range" and the large flow characteristics in the "intermediate opening range" and the "high opening range".

According to the EGR valve 1 in the present embodiment, the valve seat 4 is held in engagement with the shoulder 3*c* by the elastic force of the third compression spring 36. Thus, the valve seat 4 is not moved improperly. In the "low opening range", therefore, EGR gas is not allowed to improperly flow through between the valve seat 4 and the shoulder 3*c*. This makes it possible to prevent irregular changes in EGR gas flow rate and ensure stable accurate flow characteristics.

In the present embodiment, the seal member 40 is provided in the contact portion of the valve seat 4 with the shoulder 3*c*. Thus, the respective contact portions of the valve seat 4 and the shoulder 3*c* are sealed in the "low opening range". In the "low opening range", it is therefore possible to prevent leakage of EGR gas through between the valve seat 4 and the shoulder 3*c*, thereby ensuring the stable accurate flow characteristics.

In the present embodiment, furthermore, in the "intermediate opening range" and the "high opening range", the movement of the valve seat 4 is guided in the direction of stroke movement by the relationship between the guide hole 2*b* and the cylindrical part 4*b*. This can reduce wobbling of the valve seat 4 during movement. Accordingly, it is possible to prevent irregular changes in the measuring section between the valve seat 4 and the shoulder 3*c*, prevent irregular changes in EGR gas flow rate in the "intermediate opening range" and the "high opening range", and ensure stable large flow characteristics.

<Second Embodiment>

A second embodiment of an exhaust gas recirculation valve (an EGR valve) according to the invention will be explained below in detail referring to the accompanying drawings.

In this embodiment, similar or identical parts to those in the first embodiment are given the same reference signs as those in the first embodiment and their details are not repeatedly explained. The following explanation is thus made with a focus on differences from the first embodiment.

Figure 5:
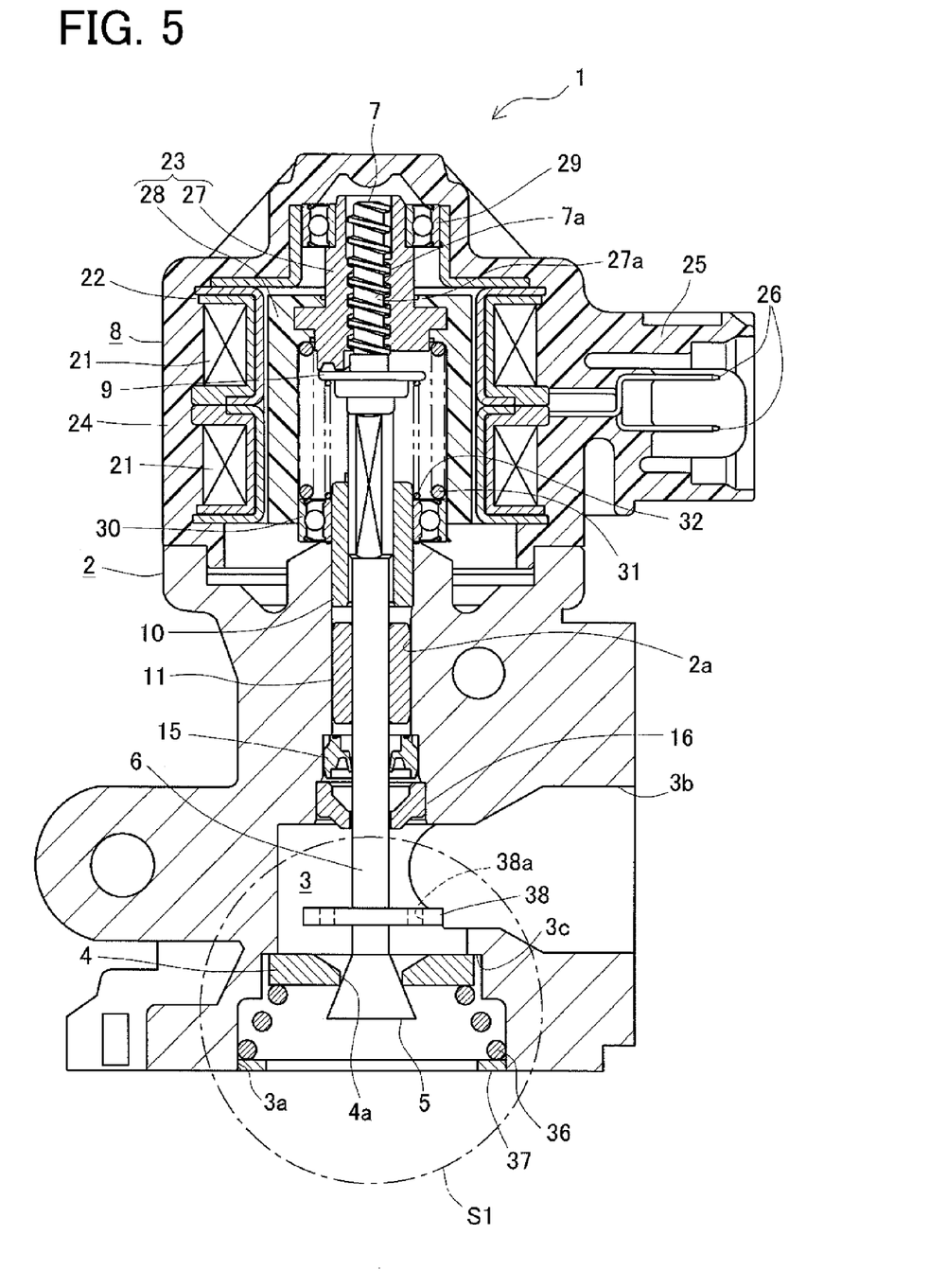
FIG. 5 is a front cross sectional view showing an EGR valve in a fully closed position in a second embodiment.
Figure 6:
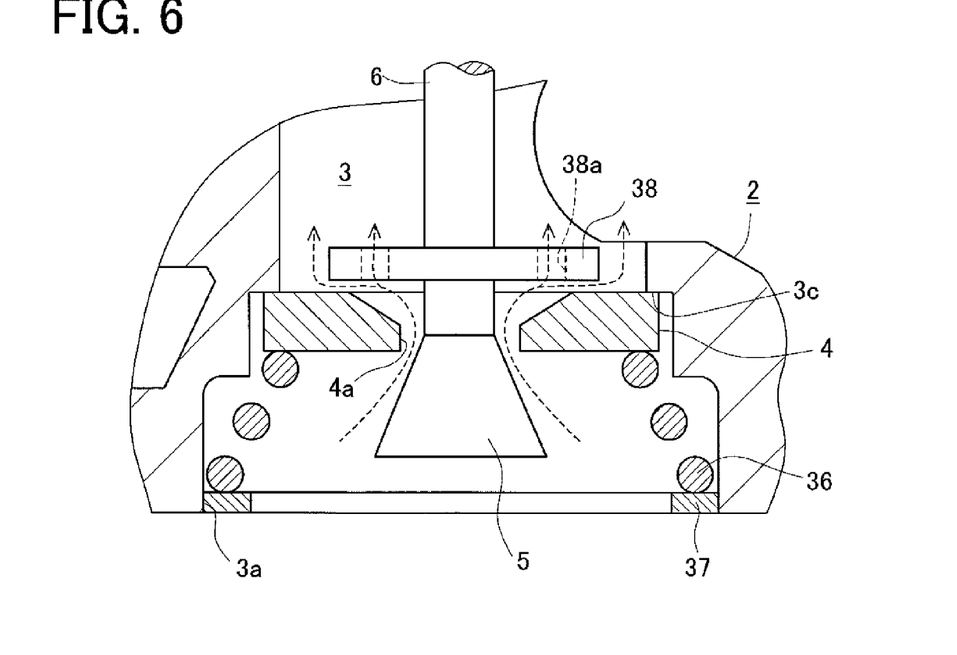
FIG. 6 is an enlarged cross sectional view showing a part circled with a chain line in FIG. 5 in an intermediately open position in the second embodiment.
Figure 7:
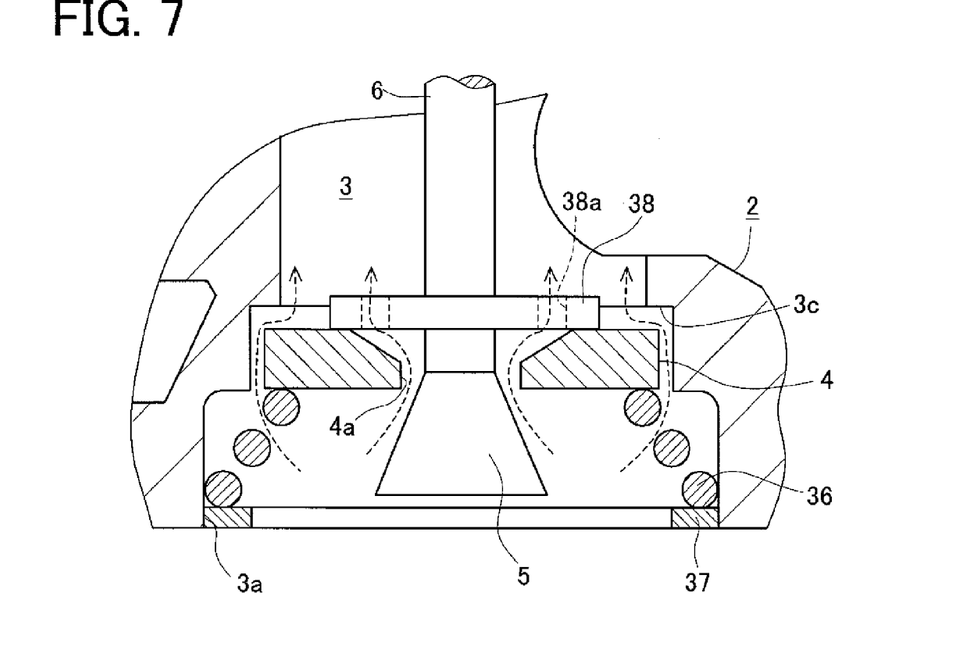
FIG. 7 is an enlarged cross sectional view showing the part circled with the chain line in FIG. 5 in a fully open position in the second embodiment.

FIG. 5 is a front sectional view of the EGR valve 1 in a fully closed position. FIG. 6 is an enlarged cross sectional view showing a part S1 circled with a chain line in FIG. 5 in an intermediately open position. FIG. 7 is an enlarged cross sectional view showing the part S1 circled with the chain line in FIG. 5 in a fully open position. The present embodiment differs from the first embodiment in the configurations of a valve seat 4, a valve element 5, an engagement part, and others.

The present embodiment does not include the cylindrical part 4*b* of the valve seat 4 and the seal member 40 provided in the valve seat 4 of the first embodiment. In a mounting hole 2*a* of a housing 2, a deposit guard plug 16 is provided adjacent to the lip seal 15. This deposit guard plug 16 is placed to prevent deposits from entering between the housing 2 and a valve stem 6 and has a nearly cylindrical shape. The deposit guard plug 16 is directly press-fitted in the mounting hole 2*a* formed in the housing 2 so that the valve stem 6 extends through the center of the deposit guard plug 16.

As shown in FIGS. 5 to 7, the upper end of the valve seat 4 is provided to be contactable with a shoulder 3*c*. The valve seat 4 is provided to be movable in a direction of stroke movement (a vertical direction in FIGS. 5 to 7) of the valve stem 6 with respect to a passage 3 and also provided to be engageable with the shoulder 3*c*. A third compression spring 36 is provided between the valve seat 4 and the housing 2. This third compression spring 36 is one example of the elastic member of the invention to hold the valve seat 4 in engagement with the shoulder 3c by an elastic force in the "low opening range" and the "intermediate opening range" which will be mentioned later. The third compression spring 36 is held between a stopper ring 37 fitted in an inlet 3a and the valve seat 4 to urge the valve seat 4 in a direction to bring the valve seat 4 into pressure contact with the shoulder 3c. On the valve stem 6, furthermore, a disk-like plate 38 is fixed, which is one example of the engagement part of the invention. This plate 38 is formed with a plurality of through holes 38a. The through holes 38a have a predetermined open area to ensure a desired flow rate. The plate 38 is provided to be contactable with the upper surface of the valve seat 4.

In a fully closed state where the valve seat 4 is in pressure contact with the shoulder 3c and the valve element 5 is seated on the valve seat 4 as shown in FIG. 5, the magnet rotor 23 is rotated in one direction. Accordingly, the engagement relation between the male screw threads 7a of the output shaft 7 and the female screw threads 27a of the rotor body 27 causes the output shaft 7 to rotate in one direction against the urging force of the second compression spring 32 to perform stroke movement in a downward direction in FIG. 5. In association with this stroke movement of the output shaft 7, the valve element 5 together with the valve stem 6 is moved in stroke in the downward direction in FIG. 5 and the valve element 5 is separated from the valve seat 4, thereby opening a valve as shown in FIG. 6. As the valve element 5 is moved with respect to the valve seat 4 in association with the stroke movement of the valve stem 6 as above, the opening degree in the "low opening range" and the "intermediate opening range" of the EGR valve 1 is changed. The change in opening degree of the EGR valve 1 in the "intermediate opening range" terminates when the plate 38 engages with the valve seat 4. The changes in opening degree of the EGR valve 1 in the "low opening range" and the "intermediate opening range" are defined by the change in size of a clearance (a measuring section) between the valve element 5 and the valve seat 4. In these "low opening range" and "intermediate opening range", EGR gas having passed through between the valve element 5 and the valve seat 4 flows to a downstream side in the passage 3 through between the valve seat 4 and the plate 38 or through the through holes 38a of the plate 38.

Thereafter, when the valve element 5 together with the valve stem 6 is further moved in stroke in the downward direction in FIG. 5, the plate 38 pushes the valve seat 4 downward, thereby moving the valve seat 4 downward together with the valve element 5 as shown in FIG. 7. Thus, the opening degree of the EGR valve 1 in the "high opening range" is changed. In this manner, the change in opening degree of the EGR valve 1 in the "high opening range" is defined by the changes in size of a maximum clearance (a measuring section) between the valve element 5 and the valve seat 4 and a clearance (a measuring section) between the valve seat 4 and the shoulder 3c. In this "high opening range", the EGR gas flows to the downstream side in the passage 3 through between the valve seat 4 and the shoulder 3c and also the EGR gas passed through between the valve element 5 and the valve seat 4 flows to the downstream side in the passage 3 through the through holes 38a of the plate 38. Thus, as compared to the flow rate of EGR gas flowing in the "low opening range" and the "intermediate opening range", the flow rate in the "high opening range" is sharply changed.

On the other hand, in a fully open state where the valve element 5 is separated from the valve seat 4 by a maximum distance and also the valve seat 4 is separated from the shoulder 3c by a maximum distance as shown in FIG. 7, the magnet rotor 23 is rotated in the opposite direction. Accordingly, the engagement relation between the male screw threads 7a of the output shaft 7 and the female screw threads 27a of the rotor body 27 and the urging force of the second compression spring 32 cause the output shaft 7 to rotate in the opposite direction to perform stroke movement in an upward direction in FIG. 5. In association with this stroke movement of the output shaft 7, the valve element 5 and the plate 38 to move together with the valve stem 6 in stroke in the upward direction in FIG. 5. Thus, the valve seat 4 first comes into engagement with the shoulder 3c and is held there under pressure by the third compression spring 36, and then the valve element 5 comes into contact with the valve seat 4, reaching a fully closed state.

Figure 8:
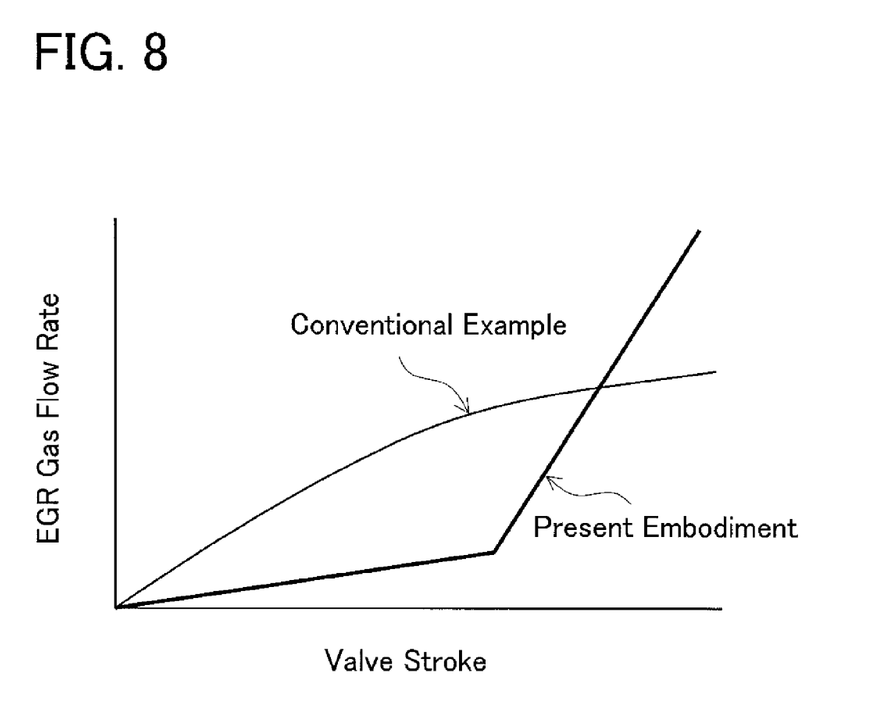
FIG. 8 is a graph showing flow characteristics of an EGR valve in comparison to the flow characteristics of the EGR valve in the conventional example.

FIG. 8 is a graph showing the flow characteristics of the EGR valve 1 in the present embodiment in comparison to the flow characteristics of the EGR valve in the conventional example. The graph in FIG. 8 shows changes in EGR gas flow rate with respect to valve stroke (a movement amount of the valve element in the stroke movement direction). In the present embodiment, as clearly found in this graph, the EGR gas flow rate to the valve stroke changes gently in the "low opening range" and the "intermediate opening range" and changes sharply in the "high opening range" as compared to the conventional example. The EGR valve 1 in this embodiment can therefore obtain accurate flow characteristics capable of regulating an accurate amount of EGR gas in the "low opening range" and the "intermediate opening range", and obtain large flow characteristics capable of regulating a large amount of EGR gas in the "high opening range". Thus, both if the accurate flow characteristics and the large flow characteristics can be achieved.

According to the EGR valve 1 in the present embodiment explained above, the valve stem 6 is moved in stroke by the actuator 8 to change the opening degree of the valve element 5 with respect to the valve seat 4, thereby regulating EGR gas allowed to flow in the passage 3. Herein, the valve element 5 is moved with respect to the valve seat 4 in association with the stroke movement of the valve stem 6, thereby changing the opening degree in the "low opening range" and the "intermediate opening range". Furthermore, when the plate 38 engages with the valve seat 4 and then the valve seat 4 is moved together with the valve element 5, the opening degree in the "high opening range" is changed. In the "low opening range" and the "intermediate opening range", therefore, the flow rate of EGR gas is regulated in minute amounts only by the measuring section between the valve seat 4 and the valve element 5. In the "high opening range", the flow rate of EGR gas is regulated in large amounts by the measuring section between the valve seat 4 and the valve element 5 and the measuring section between the shoulder 3c and the valve seat 4. As a result, the single EGR valve 1 can achieve both the accurate flow characteristics in the "low opening range" and the "intermediate opening range" and the large flow characteristics in the "high opening range".

The present invention is not limited to the above embodiments and may be embodied in other specific forms without departing from the essential characteristics thereof.

Although the seal member 40 is attached to the valve seat 4 in the first embodiment, a seal member also may be provided in the shoulder 3c instead of the valve seat 4.

In the first embodiment, the seal member 40 is provided between the valve seat 4 and the shoulder 3c. In the second embodiment, a seal member may also be provided between the valve seat 4 and the shoulder 3c as in the first embodiment.

In the first embodiment, the step 6b formed in the valve stem 6 is provided as the engagement part. As an alternative, a plate serving as the engagement part may be provided on the valve stem 6 as in the second embodiment.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The invention is applicable to an EGR valve to be used in for example an EGR apparatus of a vehicle engine.

REFERENCE SINGS LIST

1 EGR valve
2 Housing
2b Guide hole (Guide unit)
3 Passage
3c Shoulder
4 Valve seat
4b Cylindrical part (Guide unit)
5 Valve element
6 Valve stem
6b Step (Engagement part)
8 Actuator (Drive unit)
36 Third compression spring (Elastic member)
38 Plate (Engagement part)
40 Seal member

The invention claimed is:

1. An exhaust gas recirculation valve including:
a housing having a passage for exhaust recirculation gas;
a valve seat provided in the passage;
a valve element provided to be seatable on the valve seat;
a valve stem integrally provided with the valve element to move the valve element with respect to the valve seat; and
a drive unit to move the valve stem together with the valve element in stroke in an axial direction,
an opening degree of the valve element being changeable with respect to the valve seat by stroke movement of the valve stem caused by the drive unit,
wherein the passage is provided with a shoulder,
the valve seat is provided to be movable in the passage in a direction of the stroke movement and engageable with the shoulder,
the valve stem is provided with an engagement portion, and
the valve element is moved with respect to the valve seat in association with the stroke movement of the valve stem to change an opening degree in a low opening range and further the engagement portion engages with the valve seat and the valve seat is moved together with the valve element to change an opening degree in a high opening range.

2. The exhaust gas recirculation valve according to claim 1, further including an elastic member to hold the valve seat in engagement with the shoulder by an elastic force in the low opening range.

3. The exhaust gas recirculation valve according to claim 2, further including a seal member provided in a contact portion of the valve seat with the shoulder.

4. The exhaust gas recirculation valve according to claim 1, further including a seal member provided in a contact portion of the valve seat with the shoulder.

5. The exhaust gas recirculation valve according to claim 1, further including a guide unit to guide the valve seat in the direction of the stroke movement.

6. The exhaust gas recirculation valve according to claim 5, wherein
the valve seat is formed in a flat plate shape and includes a cylindrical part extending upward in a center and having a closed bottom,
the housing is formed with a guide hole in a center,
the cylindrical part is mounted in the guide hole to be movable upward and downward, and
the guide unit includes the cylindrical part and the guide hole.

* * * * *